United States Patent [19]

Hayner

[11] Patent Number: 6,163,730
[45] Date of Patent: Dec. 19, 2000

[54] METHOD AND CONTROL SYSTEM FOR CHANGING THE STATE OF A PLANT

[75] Inventor: David A. Hayner, Austin, Tex.

[73] Assignee: Motorola, Inc., Schaumburg, Ill.

[21] Appl. No.: 08/909,372

[22] Filed: Aug. 11, 1997

[51] Int. Cl.$^7$ .................................................. G05B 13/02
[52] U.S. Cl. ................................ 700/54; 700/28; 706/56; 706/57; 706/58
[58] Field of Search .................... 700/54, 28; 706/56, 706/57, 58; 713/1; 318/632, 156

[56] References Cited

U.S. PATENT DOCUMENTS

| | | | |
|---|---|---|---|
| 5,089,984 | 2/1992 | Stuger et al. | 713/1 |
| 5,270,917 | 12/1993 | Kimura | 700/82 |
| 5,355,065 | 10/1994 | Narazaki et al. | 318/632 |
| 5,414,798 | 5/1995 | Nigawara et al. | 706/58 |
| 5,677,609 | 10/1997 | Khan et al. | 318/560 |
| 5,710,492 | 1/1998 | Konishi et al. | 318/156 |
| 5,886,895 | 3/1999 | Kita et al. | 700/28 |

*Primary Examiner*—William Grant
*Assistant Examiner*—Victoria Robinson

[57] ABSTRACT

A device in accordance with the present invention includes drive circuitry (110) coupled to a plant (120). The drive circuitry (110) generates a first set of command signals to transition the state of the plant (120) from an initial state to an intermediate state at a first discrete time. The drive circuitry (110) generates a second set of command signals to transition the state of the plant (120) from the intermediate state to the final state at a second discrete time. A state estimator (130) is coupled to the plant to detect the state of the plant (120). A method for changing the state of a plant (120) is also provided. The method includes the steps of transitioning the plant (120) from a first state to a selected state at one of a plurality of discrete times, each of the discrete times being separated by at least one discrete time interval, and transitioning the plant (120) from the selected state to a final state at another of the plurality of discrete times.

17 Claims, 5 Drawing Sheets

METHOD AND CONTROL SYSTEM FOR CHANGING THE STATE OF A PLANT

FIELD OF THE INVENTION

The present invention generally relates control systems. More particularly, the present invention relates to methods and apparatus for controlling plants or servo devices.

BACKGROUND OF THE INVENTION

Control systems have been widely used in a variety of applications, such as, for example, industrial manufacturing applications, navigational systems, communication systems, and information storage and retrieval systems. Regulating control systems usually maintain a plant or actuator in a given state (i.e. position, velocity, acceleration, temperature, pressure, or pH) despite unknown external inputs which may tend to force the plant or actuator to drift away from the selected state. The control system may also cause the plant or actuator to change from one state to another state in a rapid and predictable manner.

One method of minimizing the time to change a second order plant from an initial state to a final state is to apply a maximum control signal (i.e. current, voltage, torque or pressure) to the plant to change the state as fast as possible to a halfway point. The time required to reach this halfway point may be one-half the time required to move from the initial state to the final state. At this point, an opposite control signal is applied to the plant to change the state of the plant to the final state. This is referred to as a "bang-bang" technique. The first phase is referred to as the first bang, while the second phase is referred to as the second bang.

However, variations in the control signals, the plant parameters, the environment surrounding the plant, and the mechanical characteristics of the plant can cause the plant to overshoot or undershoot the final state. Further, in discretized systems, the control inputs are typically changed at uniformly spaced time intervals (i.e. the update rate) and the state of the plant can usually only be measured at uniformly spaced points in time (i.e., the sampling rate). Assuming that maximum control signals are used, the probability of a required switching time coinciding with the update rate is very low. As a result, the maximal command signals are usually applied for either a longer or shorter period of time than is required. This will result in an error in the final state after the minimum number of discrete sampling intervals.

SUMMARY OF THE INVENTION

The present invention relates to methods and devices for controlling the state of a plant, such as an actuator or a servo device. The state of the plant can be accurately and quickly changed to another state (i.e. position, velocity, acceleration, temperature, or pH) with minimal overshoot or undershoot. The methods and devices of the present invention can change the state of the plant in the shortest amount of discrete time intervals allowed by the dynamics of the plant. The plant arrives at the final state at a predetermined discrete point in time. The plant can be further controlled to meet specific states at specific quantified time intervals.

The plant can be changed from an initial state to a final state in a minimum number of discrete time intervals. A set of control/command update signals are generated to cause the plant to change from the initial state to a predetermined state. From the predetermined state, control/command update signals are generated to ensure that the plant arrives at the desired state in a minimum amount of discrete time intervals. The plant arrives at the final state with approximately zero state error at a discrete point in time despite uncertainty in the parameters of the plant. The plant may include, for example, electromagnetic servo devices (i.e. rotary actuators or coil type actuators), electro-hydraulic systems, temperature regulating systems, and pressure control systems.

One device in accordance with the present invention includes drive circuitry coupled to a plant. The drive circuitry generates a first set of command signals to transition the state of the plant from an initial state to an intermediate state at a first discrete time. The drive circuitry generates a second set of command signals to transition the state of the plant from the intermediate state to the final state at a second discrete time. A state estimator is coupled to the plant to detect the state of the plant.

One method in accordance with the present invention includes the steps of transitioning the plant from a first state to a selected state at one of a plurality of discrete times, each of the discrete times being separated by at least one discrete time interval, and transitioning the plant from the selected state to a final state at another of the plurality of discrete times.

The invention, together with further attendant advantages, may best be understood by reference to the following detailed description taken in conjunction with the accompanying drawings.

BRIEF DESCRIPTION OF THE DRAWINGS

FIG; 1 is a block diagram of a system for controlling a plant.

DETAILED DESCRIPTION OF THE PREFERRED EMBODIMENTS

Before explaining the present invention in detail, it should be noted that the invention is not limited in its application or use to the details of construction and arrangement of parts illustrated in the accompanying drawings and description, because the illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

Figure 1:
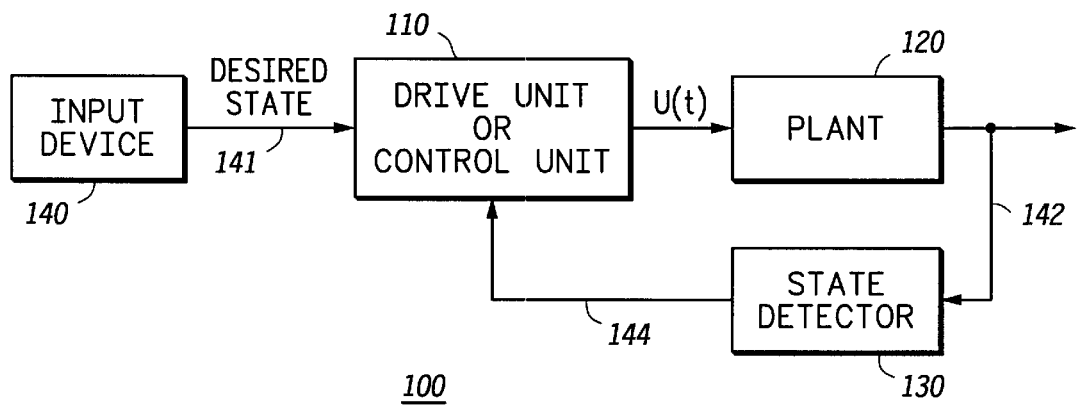

Referring now to the drawings, FIG. 1 illustrates a block diagram of a system 100 for controlling a plant 120, such as, for example an actuator or servo motor. The plant 120 is preferably modeled as at least a partially controllable and at least a partially observable Nth order continuous linear system. It will also be recognized that the plant may be a non-linear system. The system 100 can change the plant 120 from an initial or first state to a final or desired state (i.e.

position, velocity, acceleration, temperature, pressure, or pH) in a minimum number of sample or control update time intervals. The plant 120 can reach the final state with near zero error at a specified sampling or control update time interval, despite uncertainty in the parameters of the system.

The plant 120 can be changed from the first state to an intermediate state or reachable set of states at a sampling or control update time interval. When the plant 120 reaches the intermediate state, control/command update signals are generated to change the plant 120 from the intermediate state to the final state in a minimum amount of sampling or control update time intervals. It will be recognized that the system 100 may cause the plant 120 to move an object from an initial position to a desired or final position or the plant 120 may change the condition of the environment from a initial condition to a desired condition (i.e. temperature, pressure, etc.).

As shown in FIG. 1, the system 100 preferably includes a drive or control unit 110, a state detector 130, and an input device 140. The drive unit 110 provides control/command update signals u(t) to the plant 120 to change the state of the plant 120.

The plant 120 is preferably modeled as at least a partially controllable and at least a partially observable Nth order continuous linear system. It will also be recognized that the plant 120 may be a non-linear system. The plant 120 may be an electromagnetic servo device (i.e., a rotary type actuator, a linear type actuator or a coil type actuator), an electro-hydraulic system, a temperature regulating system, a pressure control system a heating element, a pump, a valve, a voice coil motor (VCM) or any other suitable plant.

The state of the plant 120 is preferably observed or sampled at discrete time intervals at time, $nT_1$, and the control/command update signals u(t) are preferably changed at discrete time intervals at time, $nT_2$, (where n is an integer, and $T_1$ and $T_2$ are fixed time increments). It is contemplated that the rate of the control/command update signals $nT_2$ may correspond to the sampling rate $nT_1$. The state of the plant 120 is changed so that the state of the system equals specific values at particular points in time (i.e., $nT_1$ or $nT_2$). It will be recognized that all of the states of the plant 120 may not be observable or controllable.

When the plant 120 is driven by the control/command update signals, the plant 120 can transition from an initial state to a desired or final state with a minimum number of discrete time intervals in accordance with the dynamics of the plant 120. The state of the plant 120 is preferably changed from a first state to a second or intermediate state at time interval (nT) (where T may equal $T_1$ or $T_2$).

From the intermediate state, one or more control/command update signals are applied to the plant 120 to change the state of the plant 120 to the final state as further described below. The plant 120 can reach the final state with near zero error at a discrete point in time (n+m)T (where T may equal $T_1$ or $T_2$), despite uncertainty in the gain and other parameters of the plant 120.

The state detector 130 of the system 100 detects or senses a signal indicative of the state of the plant 120 on line 142. The state detector 130 may include temperature, pressure, velocity or position sensor(s). For example the state detector 130 may detect the position, velocity, and/or acceleration of the plant 120 or the state detector 130 may detect the temperature, pressure and/or pH of the plant 120.

The state detector 130 processes the signal indicative of the state of the plant 120 and generates a feedback or output signal on line 144 to the drive unit 110. The feedback signal may be a digital or analog signal. It is contemplated that the state detector 130 may be any suitable device that can determine one or more states of the plant 120.

The input device 140 of the system provides commands or requests to the drive unit 110. The input device 140 can provide the desired or final state of the plant 120 to the device unit 110 on line 141. The input device 140 may be a host computer or any other suitable device.

The drive unit 110 of the system 100 receives requests or commands from the input device 140 to perform various operations. The drive unit 110 also receives signals indicative of one or more states of the plant 120 from the state detector 130. The drive unit 110 utilizes a control algorithm, as further described below, to generate control/command update signals u(t). The control/command update signals are provided to the plant 120 of the system 100 to change or control the state of the plant 120.

The drive unit 110 may be implemented utilizing hardware components and circuitry designs, computer programming, or a combination thereof. For example, the drive unit 120 may include a microprocessor, such as, for example, a model 68HC11, microprocessor available from Motorola. It is also contemplated that the drive unit 110 may be hard wired into an application specific integrated circuit (ASIC) of a field programmable gate array (FPGA) or may be combinations of analog or digital circuits. The drive unit 120 may be controlled with software which, can be written in assembly language, C language, or any other suitable programming language. It will be recognized that the drive unit 110 may be any suitable device that can provide appropriate control signals to change the state of the plant 120.

The drive unit 110 can provide input control/command update signals to cause the plant 120 to reach a final state in a minimum number of discrete time intervals with near zero error. The control/command update signals may be in any suitable form, such as, for example, flux, torque, current, or voltage. The drive unit 110 can change the control/command update signal to the plant 120 at discrete points in time.

The drive unit 110 can provide the input control/command update signals to the plant 120 to transition the plant 120 from a first or initial state to a second or intermediate state at a discrete point in time nT (where n is an integer and T is a discrete time interval which may correspond to the sampling time $T_1$ or control update time $T_2$). The intermediate state may be, for example, a range of position, velocity, acceleration, pressure, temperature, or pH states or values. The intermediate state is preferably reached at no more than N time intervals from the final state (where N is the order of the plant). In certain situations, the intermediate state may be the same as the first state or may be approximately halfway between the first state and the final state depending on the dynamics of the plant.

The control/command update signals that change the plant 120 from the first state to the intermediate state may be derived based upon a command profile. The command profile may represent the acceleration of the plant 120 verses time, the velocity of the plant 120 verses time, the position of the plant 120 verses time, the temperature of the plant 120 verses time, the pressure of the plant 120 verses time, the pH of the plant 120 verses time, and/or any other suitable command profile. The command profile may be generated off-line to develop a table of control/command update signals for various state changes. The command profile for various state changes may be tabulated and stored in a storage device or memory device. It is contemplated that the command profile may also be developed on-line.

The control signals of the command profile may transition the plant 120 to the intermediate state or reachable set of states in the minimum amount of discrete sampling or control update time intervals allowed by the system. For example a "bang-bang" profile may be used to accelerate the plant 120 as fast as possible to an intermediate position state at approximately half-way between the initial and final state. At the intermediate state, the plant 120 may be decelerated as fast as possible from the intermediate state to the final state. It will be recognized that any suitable command signals may be employed to change the plant 120 to the set of intermediate states.

When the state of the plant 120 is changing from the initial state to the intermediate state, the drive unit 110 of the system 100 may generate control/command update signals to correct for the deviation between the actual state and the desired state of the plant 120 according to the command profile. The deviation between the present state and the intermediate state may be used to assure the plant 120 arrives at the intermediate state at a discrete point in time, nT. It is contemplated that any suitable control method can be utilized to change the plant 120 from the initial state to the intermediate state or reachable set of states.

From the intermediate state, the drive unit 10 provides the control/command update signals to change the state of the plant 120 to the final state in a minimum number of additional discrete time intervals mT (where mT is the minimum number of discrete time intervals required to reach the final state from the intermediate state). The total time to transition from the initial to final state is preferably (n+m)T. At the final state, the state error will be approximately zero.

To optimize transitioning the plant 120 between the intermediate state and the final state, the intermediate state is determined based upon reaching the final state with maximum control signals after accounting for the effects of the plant 120 parameter variations further described below. The final state of the plant 120 can be provided to the drive unit 110 by the input device 140. The final state may also be provided to the system by a user or operator or may be read from a storage device.

Figure 2:
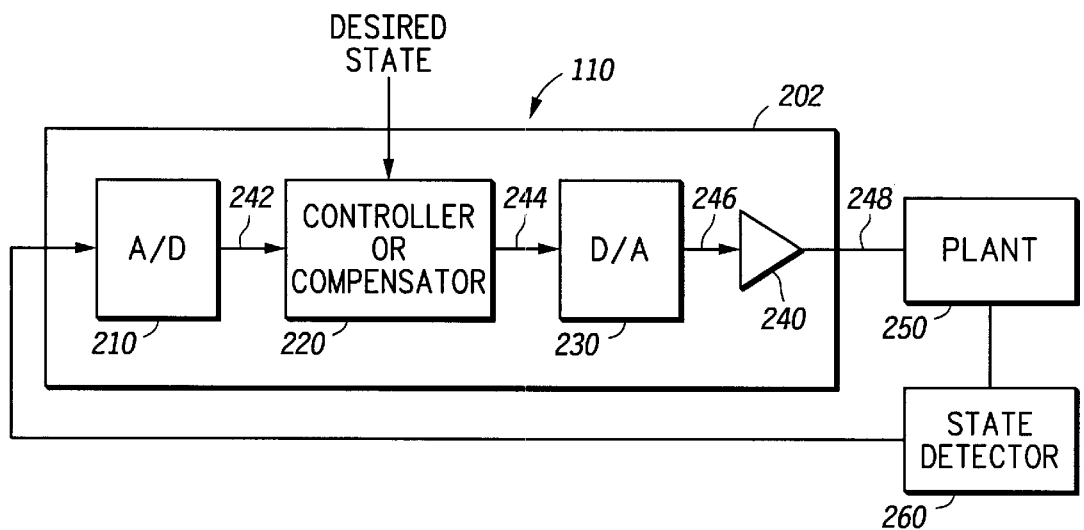
FIG. 2 is a block diagram of a drive unit of the system of FIG. 1 to control a plant.

Referring now to FIG. 2, a block diagram of an exemplary drive unit 110 of the system 100 to control a plant 250 is illustrated. The drive unit 110 preferably includes an analog to digital (A/D) converter 210, a controller or compensator 220, a digital to analog (D/A) converter 230, and an amplifier 240. It will be recognized that the drive unit 110 may be implemented utilizing any suitable hardware components and circuitry designs, computer programming, or a combination thereof.

The A/D converter 210 of the drive unit 110 receives an analog signal from a state detector 260 that corresponds to the state of the plant 250. The A/D converter 210 converts the analog signal into a digital position signal. The A/D converter 210 provides the digital signal on one or more lines 242 to the controller 220.

The controller 220 of the drive unit 110 receives the digital signal from the A/D converter 210 and provides command signals on one or more lines 244 to the input of the D/A converter 230. The controller 220 may comprise a microprocessor, such as, for example, 68HC11, available from Motorola. The controller 220 may be programmed with any suitable software to carry out the functions described below. The software can be written in assembly language, C language, or any other suitable programming language. It will be recognized that the controller 220 may be any suitable device that can provide appropriate control signals to control the operation of the plant 250.

The D/A converter 230 of the drive unit 110 converts the command signals generated by the controller 220 to corresponding analog command signals. The command signals are supplied from the output of the D/A converter 230 to an input of an amplifier 240 via line 246. The D/A converter 230 may also be implemented via a pulse width modulation device (PWM).

The amplifier 240 of the drive unit 110 amplifies the analog command signals from the D/A converter 230 by a desired or predetermined gain. The amplifier 240 supplies control/command update signals to drive the plant 250. Preferably, the amplifier 240 is a transconductance type power amplifier that converts the analog command signals to current control/command update signals.

Figure 3:
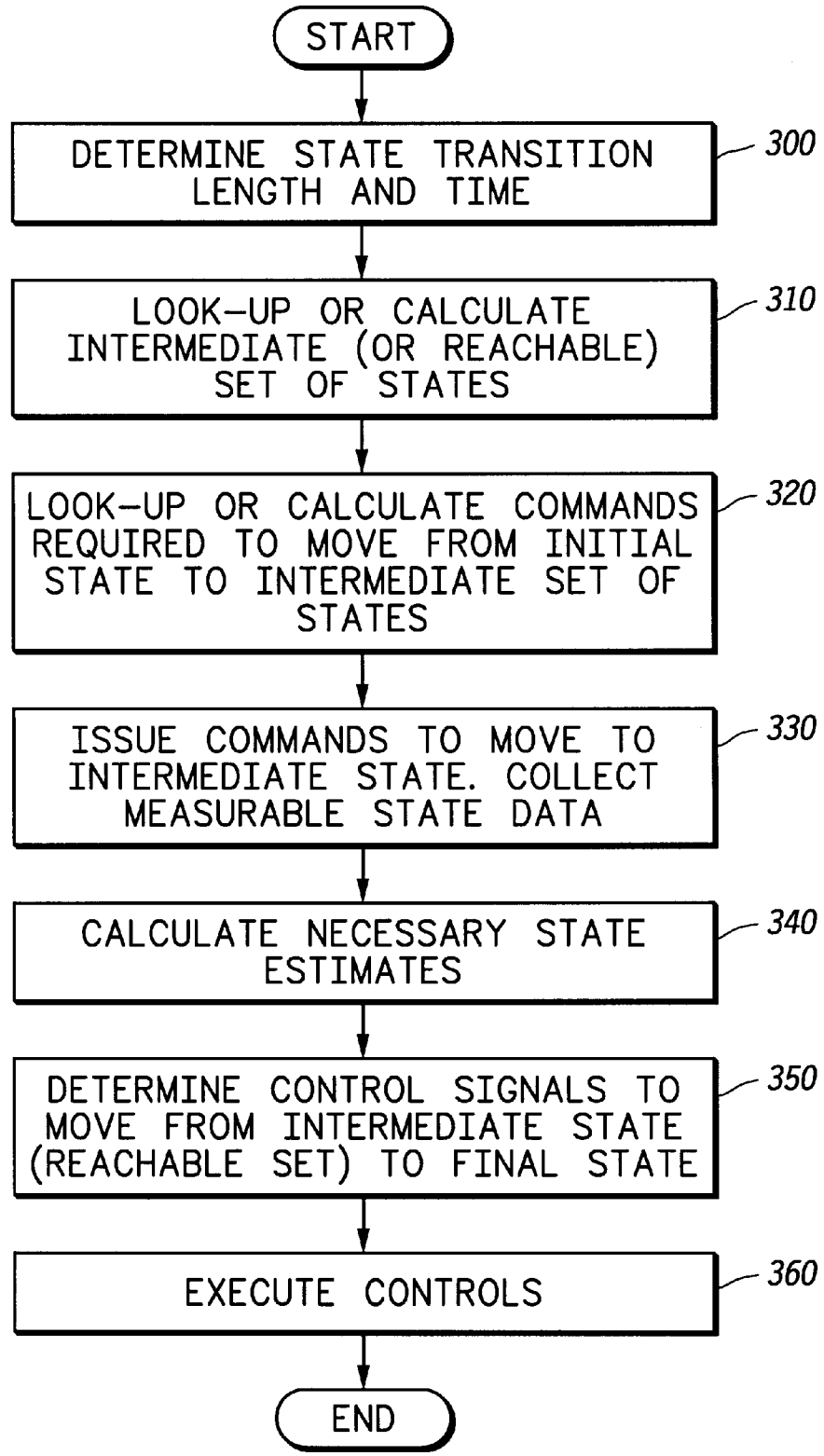
FIG. 3 is a flow diagram of an exemplary process to change the state of the plant with no compensation for parameter variations.

Referring now to FIG. 3, a flow diagram of an exemplary state transition operation with no compensation for parameter uncertainty or variations of the system of FIG. 1 is illustrated. The state transition operation can change the state of a plant from an initial state to an intermediate state or reachable set of states in nT (where T may equal $T_1$ or $T_2$) time intervals. The value of nT can be the minimum time allowed by the dynamics and the sampling or update rates of the system to reach the intermediate state.

From the intermediate state, the control system can change the state of the plant to a final state in a minimum number of discrete time intervals mT (where T may equal $T_1$ or $T_2$). The value of mT is preferably the minimum time allowed by the dynamics and the sampling or update rates of the system to reach the final state. Since the transitions from the initial state to the intermediate state and from the intermediate state to the final state can be accomplished in a minimum number of discrete time intervals, the overall state transition can be accomplished in the minimum time allowed by the system.

The plant may be represented or modeled by the following equation:

$$\dot{x}(t)=A\underline{x}(t)+Bu(t) \tag{1}$$

where $\dot{\underline{x}}(t)$ is a time derivative of the state vector;

$\underline{x}(t)$ is an N×1 state vector;

u(t) is a 1×1 control/command update signal;

A is an N×N matrix determined from the characteristics of the plant; and

B is an N×1 matrix determined from the characteristics of the plant.

As shown in FIG. 3, the state transition length and time is determined at block 300. From the state transition length, the number of discrete time intervals, nT, to reach an intermediate state from an initial state is determined. The number of discrete time intervals may be determined by a look-up table or may be calculated, or a combination thereof.

At block 310, the intermediate state (i.e., reachable set of states) is determined. The intermediate state may be calculated or may be determined by a look-up table or a combination of both. At block 320, a set of control/command update signals are determined which will change the plant from the initial state to the intermediate state. The control/command update signals may also be calculated or determined from a look-up table. It is contemplated that any suitable control method may be employed which will cause the plant to transition from the initial state to the intermediate state.

Since the intermediate state is preferably a set of states, or an N dimensional target region, the drive unit can be designed to attain this target region at a specific point in time nT. As a result, the design of the drive unit can be simplified because a finite error is allowed in a particular point in time.

At block 330, the control/command update signals are applied to the plant to move the plant from the initial state to the intermediate state. During this state transition, the available state data is sampled and stored. At block 340, the collected state data is processed to determine or estimate all other required or necessary states. The required states are those states needed to calculate the control/command update signals which can change the plant from the intermediate state to the final state.

At block 350, the calculated and measured state values are utilized to calculate the control/command update signals required to move the plant from the intermediate state to the final state. This calculation is an N×N matrix operation expressed by the equation below:

$$\begin{bmatrix} u(nT) \\ u[(n+1)T] \\ u[(n+2)T] \\ \vdots \\ u[(n+(N-1))T] \end{bmatrix} = \begin{bmatrix} G_{1,1} & G_{1,2} & G_{1,3} & \cdots & G_{1,N} \\ G_{2,1} & G_{2,2} & G_{2,3} & \cdots & G_{2,N} \\ G_{3,1} & G_{3,2} & G_{3,3} & \cdots & G_{3,N} \\ \vdots & \vdots & \vdots & & \vdots \\ G_{N,1} & G_{N,2} & G_{N,3} & \cdots & G_{N,N} \end{bmatrix} \begin{bmatrix} x_1(nT) \\ x_2(nT) \\ x_3(nT) \\ \vdots \\ x_N(nT) \end{bmatrix} \quad (2a)$$

An exemplary fourth order equation for N=4 may be expressed as follows:

$$\begin{bmatrix} u(nT) \\ u[(n+1)T] \\ u[(n+2)T] \\ u[(n+3)T] \end{bmatrix} = \begin{bmatrix} G_{1,1} & G_{1,2} & G_{1,3} & G_{1,4} \\ G_{2,1} & G_{2,2} & G_{2,3} & G_{2,4} \\ G_{3,1} & G_{3,2} & G_{3,3} & G_{3,4} \\ G_{4,1} & G_{4,2} & G_{4,3} & G_{4,4} \end{bmatrix} \begin{bmatrix} x_1(nT) \\ x_2(nT) \\ x_3(nT) \\ x_4(nT) \end{bmatrix} \quad (2b)$$

In equation 2b, $x_1(nT)$, $x_2(nT)$, $x_3(nT)$, and $x_4(nT)$ are the values of the state vectors, either measured at block 330 or calculated at block 340. The values $u(nT)$, $u[(n+1)T]$, $u[(n+2)T]$ and $u[(n+3)T]$ are the control/command update signals to be issued at times $nT$, $(n+1)T$, $(n+2)T$ and $(n+3)T$, respectively. The elements $G_{ij}$ are matrices which will be further described below.

Once the control/command update signals, $u[(n+i)T]$ (where i=0 to N-1) are calculated, the control/command update signals are provided to the plant at the appropriate times to cause the plant to transition from the intermediate state at time nT to the final state at time (n+m)T, (in equation 2b, m=n). After all the required control/command update signals have been provided to the plant, the system will be in the desired final state at time (n+m)T.

The control/command update signals may be calculated at various times during a state transition operation. For example, the first control value, u(nT), may be calculated from equation 2b and this value may be immediately provided to the plant. Thereafter, the values for the remaining control/command update signals may be calculated. It will be recognized that any suitable combination or sequence of calculations may be employed.

Figure 4:
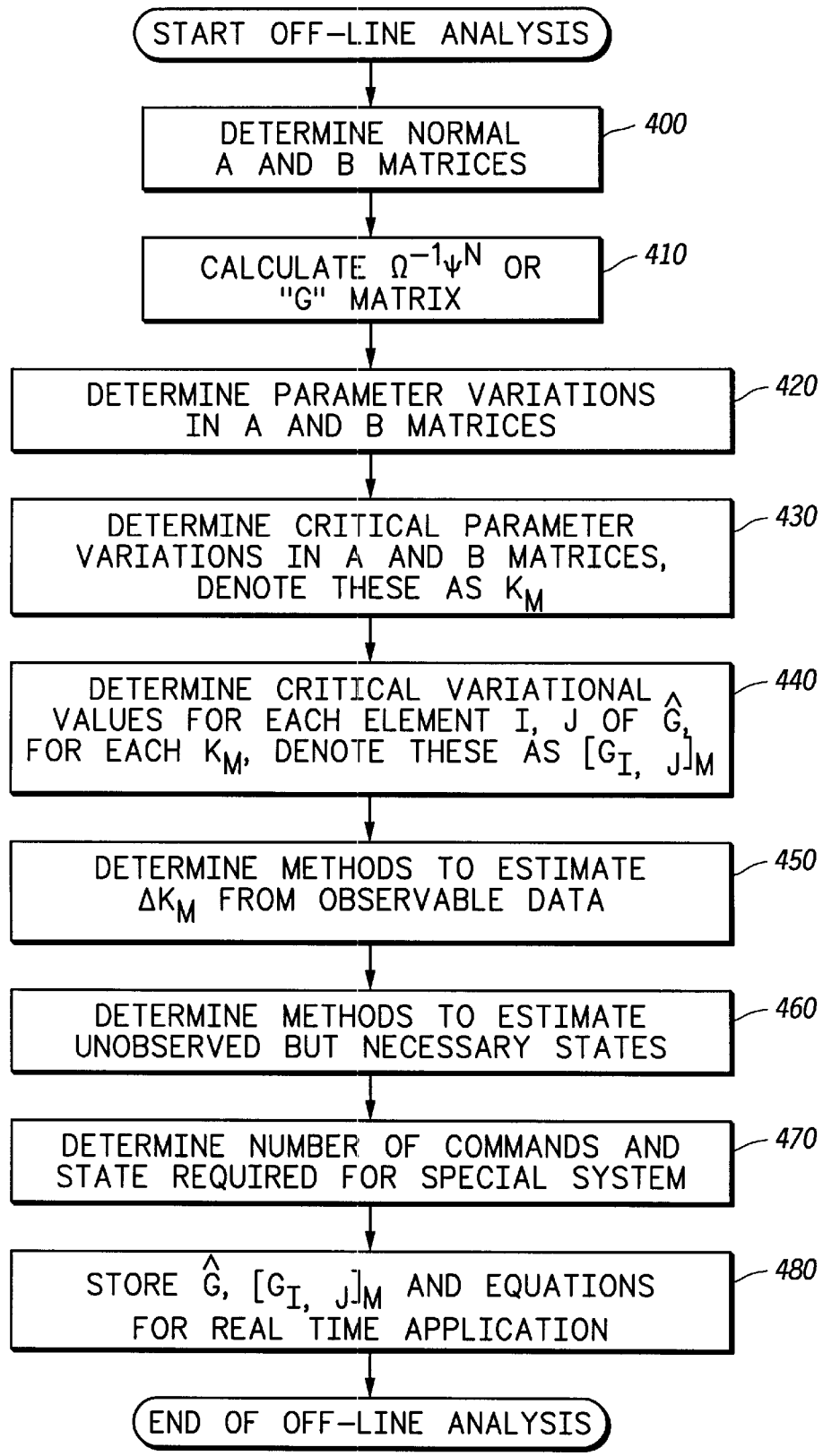
FIG. 4 is a flow diagram of an exemplary process to derive control system elements.
Figure 5:
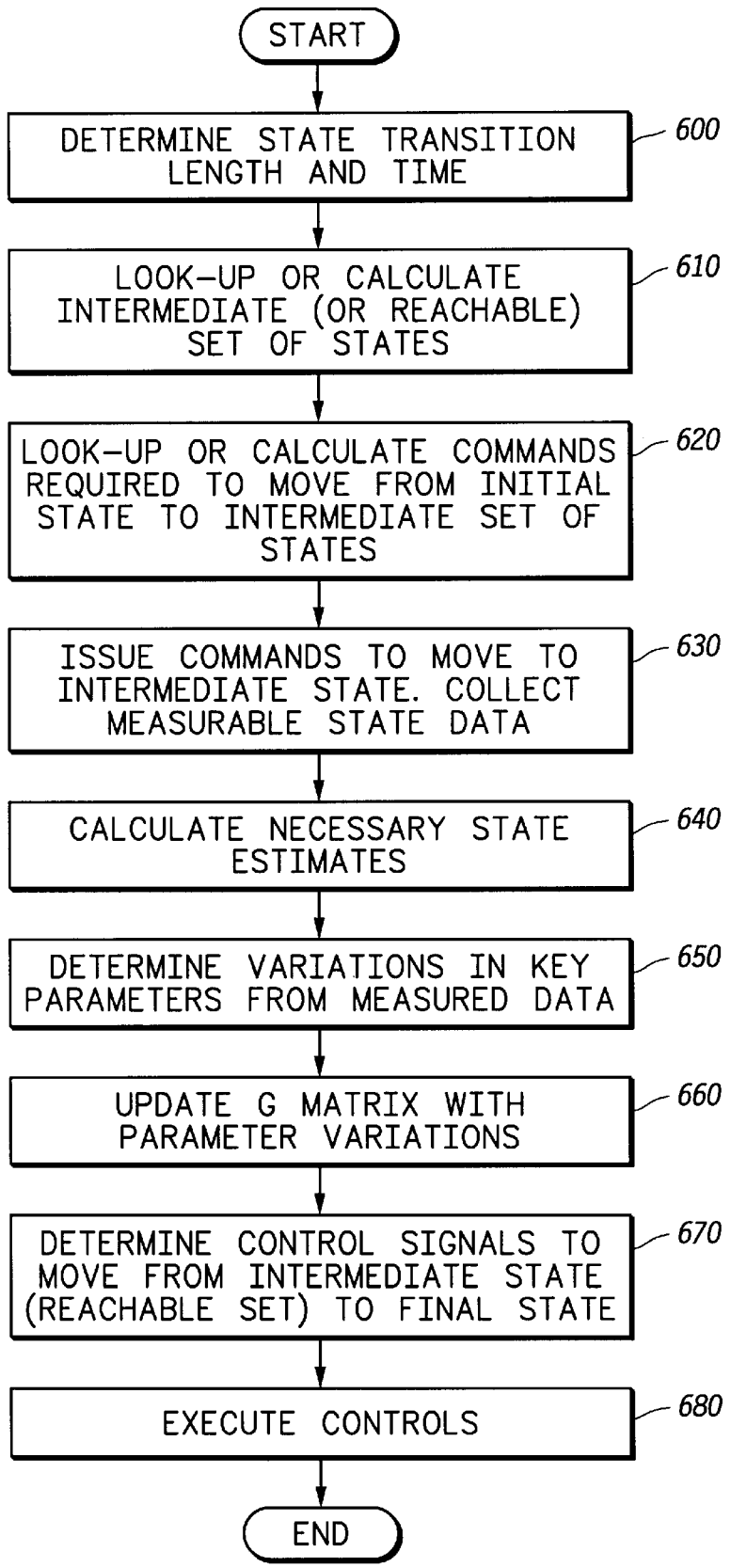
FIG. 5 is a flow diagram of an exemplary process that compensates for parameter variations.

Referring now to FIGS. 4–5, a state transition operation to account for parameter variations of the system of FIG. 1 is illustrated. The construction or execution of the state transition operation can include both off-line operations and on-line operations. At the outset, a G matrix is calculated from the A and B matrices from equation 1 above, together with the time interval, T, between control/command update signals. The time interval T may be the same as the sampling time or control update rate.

The G matrix can be calculated from the following set of equations:

$$G = \Omega^{-1} \Psi^N \underline{x}(0) = [u(0); u(T); \ldots u[(N-1)T]] \quad (3)$$

where N is the size of the A matrix.

The matrices $\Omega$ and A are given by:

$$\Omega = [\Psi^{N-1}\Gamma \ldots \Psi\Gamma\Gamma]^{-1}. \quad (4)$$

where $$\Psi = \mathcal{L}'\{(sI - A)^{-1}\}|_{t=T}$$

$$\Gamma = \int_{\tau=0}^{T} \Psi(\tau) B d\tau$$

where $\mathcal{L}^{-1}$ is the inverse Laplace Transform operator; and A and B are the matrices from equation 1.

From equation 3, the control/command update signals may be determined from the G matrix that will force the plant from an intermediate state to the final state in a minimum number of discrete time intervals mT, (where m=N and N is the order of the system). In order to account for the parameters in the A or B matrix of equation 1 that are either imprecisely known or vary, the G matrix can be modified to compensate for these perturbations as further described below. If these perturbations are not accounted for, the plant may not arrive at the final state at time (n+m)T with zero state error.

It is contemplated that any suitable method may be utilized to determine these parameter variations and to modify the G matrix to account for these changes. In one exemplary embodiment, a variational analysis of the G matrix is utilized to account for the changes or perturbations in critical system parameters as further described below. These critical system parameters are elements of the matrices A and B of equation 1.

Referring now to FIG. 4, a process for off-line operations for a state transition operation that accounts for parameter variations is illustrated. At block 400, the nominal values for all elements in the A and B matrices of equation 1 are determined. These nominal values of the A and B matrices may be the mean of a statistical distribution. From the selected nominal values of the A and B matrices, a nominal G matrix or $\hat{G}$ may be determined from equations 3 and 4 at block 410.

At block 420, the variations in the system parameters from the nominal values of the A and B matrices are determined. For example, various plants usually have a different current to force relationship, e.g., gain. The mean gain of a particular type of plant may be selected as the nominal value as described above. As a result, a statistical distribution can be constructed for the plant. From this statistical distribution, both an expected or nominal value and an estimate of the variations in the particular parameters can be constructed or determined.

At block 430, a variational analysis of the changes in the G matrix as a function of the parameter variations of the A and B matrices of block 420 is determined. The parameter variations that have a substantial impact on the overall system performance are determined. These parameter variations are referred to as $\Delta K_q$ (where q is indexing integer). It will be recognized that not all of the parameters in the A and B matrices may have a significant impact on the overall system performance.

One method for determining the critical system parameter variations is based on a variational method that can be expressed by the following equation:

$$G_{i,j} = \hat{G}_{i,j} + \sum_q \frac{\partial \hat{G}_{i,j}}{\partial K_q} \Delta K_q \tag{5}$$

where $\hat{G}_{ij}$ is the value calculated from equation 3; and $K_q$ represents variable system parameters.

At block 440, the variational analysis is continued and a functional relationship between the variations in $\Delta K_q$ and the G matrix are catalogued or generated. This parameter relationship is denoted parametrically as $[g_{ij}]_q$. Depending upon the method chosen to estimate a "true" or "actual" G from changes in the system parameters and the nominal G (or $\hat{G}$), the parametric relationship may be any suitable form. One exemplary form is an extension of equation 5 in which a first order linear relationship is assumed and the "true" or "actual" G is calculated from the nominal G (or $\hat{G}$) via the following equation:

$$G_{i,j} = \hat{G}_{i,j} + \sum_q [g_{i,j}]_q \Delta K_q \quad \text{where} \quad [g_{i,j}]_q = \frac{\partial \hat{G}_{i,j}}{\partial K_q} \tag{6}$$

In this case, the nominal values of $\hat{C}$ and the parametric values $[g_{ij}]_q$ are stored. The method or algorithm to generate the "actual" G from the nominal G (or $\hat{G}$), the $[gij]_q$ and the $\Delta K_q$ is also stored.

It will be recognized that the values of $g_{ij}$ may be calculated by any suitable method. For example, the G matrix may be calculated for various combinations and perturbations in each of the $\Delta K_q$ and the changes in the G matrix may be determined as a function of change of the $K_q$. It is contemplated that higher order or non-linear equations may also be employed to estimate G from the $g_{ij}$ and to estimate $\Delta K_q$.

At block 450, methods to estimate the change in the key parameters, $\Delta K_q$, from the observable or collected data are determined. It will be recognized that these relationships may be estimated by any suitable means. One example for estimating $\Delta K_q$ for a fourth order system is described below.

At block 460, a method to estimate the required or necessary states is determined. The method may be based on an observer or estimator design, Kalman filters, or specific equations relating to state variables. It is contemplated that any suitable method may be utilized. An example of estimating the required states for a fourth order system is described below.

At block 470, the number of control/command update signals and the required states for the plant are determined. It will be recognized that the number of states used in the calculations of the control may be reduced (i.e., the state vector on the right hand side of equation 2), or the number of outputs required to move from the intermediate to final states may be reduced. As a result, a smaller G matrix may be generated and the resulting number of computations may be decreased. At block 480, $\hat{G}$ and $[g_{ij}]_m$ as well as equations to estimate G from $\hat{G}$ and $[gij]_q$ are stored.

Referring now to FIG. 5, the on-line process of the state transition operation that compensates for parameter variations is illustrated. The functions performed at blocks 600–640 are substantially the same as blocks 300–340 of FIG. 4 as described above.

At block 650, the variations in the key parameters, $\Delta K_q$, are estimated. The parameters are based on the available or measured data and the estimated state vectors. The variations in the parameters are used to update the G matrix at block 660. This can be accomplished via equation 6 as described above. Blocks 670 and 680 are substantially the same as blocks 550 and 560 of FIG. 4.

An exemplary fourth order system (N=4) to carry out the principles of the process of FIGS. 4 and 5 is described below. First, nominal A and B matrices and a nominal G matrix of the plant are determined. Next, by simulation and analysis, the parameter variations of the A and B matrices are determined. It was discovered that the plant gain, K, and the bandwidth and damping of the system were the parameters that have any significant variation of the fourth order system. From equation 5 above, the plant gain was then determined as the only parameter to have any significant impact on the performance of the system over the range of parameter variations.

Next, a particular method for calculating $\Delta K$ is determined. In this exemplary embodiment, the equation for $\Delta K$ can be expressed as follows:

$$\Delta K = \frac{\hat{K}}{\hat{x}_1(nT)}(x_1(nT) - \hat{x}_1(nT)) \tag{7}$$

where K is the nominal or expected plant gain (the same as the value used in the appropriate element in the A or B matrix);

$\hat{x}_1(nT)$ is the expected plant position at time NT; and $x_1(nT)$ is the actual measured value.

Next, the G matrix is simplified. In this embodiment, it was determined that only the position and velocity are needed and the fourth control output was not required. Accordingly, the first three outputs calculated from the nominal or perturbed G matrix provided a sufficiently small state error at time $[(n+3)T]$, from control inputs at times $(n+1)T$ and $(n+2)T$.

The methods to determine the necessary states are then derived. In this embodiment, only position could be measured. From the position measurements, a method to estimate velocity from the position measurements can be derived. One method to estimate velocity can be expressed by the equation:

$$x_2(nT) = \frac{3x_1(nT)}{2T} - \frac{2x_1[(n-1)T]}{T} + \frac{x_1[(n-2)T]}{2T} \tag{8}$$

By substituting equation 8 into a simplified version of equation 2b, the following systems of equations can be derived:

$$\begin{bmatrix} u(nT) \\ u[(n+1)T] \\ u[(n+2)T] \end{bmatrix} = \begin{bmatrix} G_{1,1} + \frac{3G_{1,2}}{2T} & \frac{-2G_{1,2}}{T} & \frac{G_{1,2}}{2T} \\ G_{2,1} + \frac{3G_{2,2}}{2T} & \frac{-2G_{2,2}}{T} & \frac{G_{2,2}}{2T} \\ G_{3,1} + \frac{3G_{3,2}}{2T} & \frac{-2G_{3,2}}{T} & \frac{G_{3,2}}{2T} \end{bmatrix} \begin{bmatrix} x_1(nT) \\ x_1[(n-1)T] \\ x_1[(n-2)T] \end{bmatrix} \tag{9}$$

By substituting equation 7 into 6, $G_{ij}$ in equation 9 can be expressed as:

$$G_{i,j} = \hat{G}_{i,j} + \frac{g_{ij}\hat{K}}{\hat{x}_1(nT)}(x_1(nT) - \hat{x}_1(nT)) \tag{10}$$

The $\hat{G}_{ij}$ and $g_{ij}$ can be stored in memory. Equations 9 and 10 described above can be programmed and stored for use during real-time operations.

During on-line operations, the length of the state transition operation is initially determined. From the length of the state transition operation, the number of discrete time intervals, nT, is determined. The intermediate state is then determined and the control/command update signals to transition the plant from the initial state to the intermediate state are derived.

The control/command update signals are then applied to the plant to move the plant from the initial state to the intermediate state. During this state transition, the available state data is sampled and stored. The collected state data is processed and all other necessary states are determined (i.e., velocity).

The variations of the key parameters ΔK are determined based upon the measured data and estimated state vectors. The variation in the parameters are used to update the G matrix.

Next, the control/command update signals to change the plant from the intermediate state to the final state are calculated. The control/command update signals are then provided to the plant to transition the plant from the intermediate state to the final state.

Figure 6:
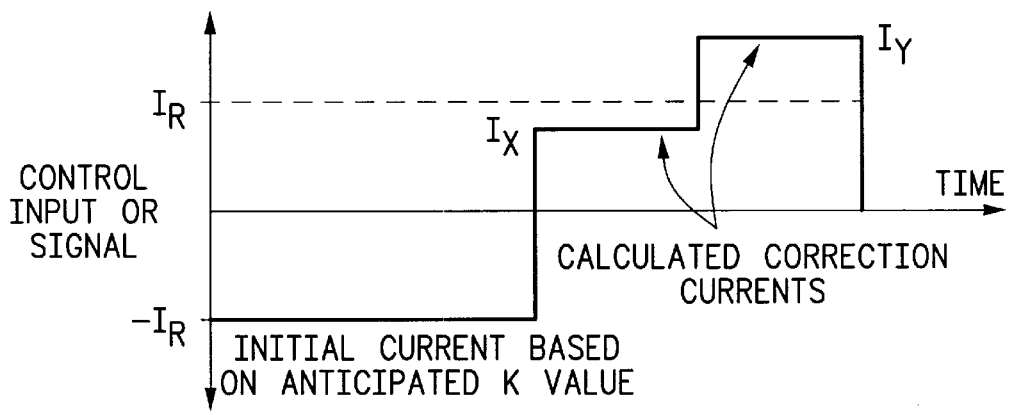
FIGS. 6–8 are graphical representations of a family of curves of the system of FIG. 1.
Figure 7:
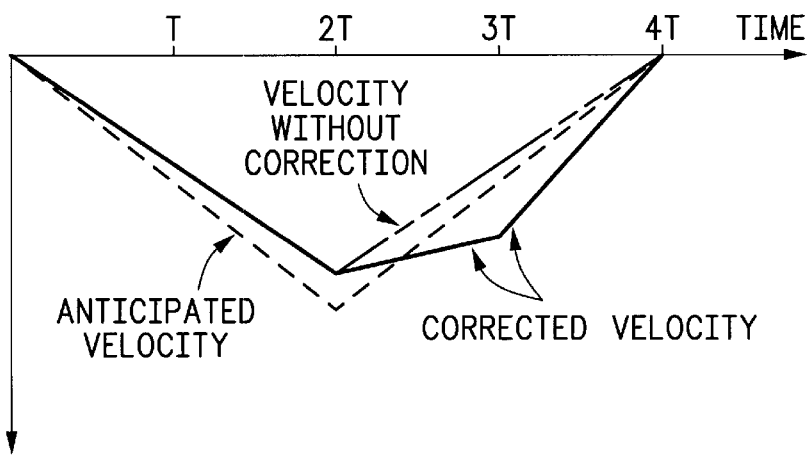
Figure 8:
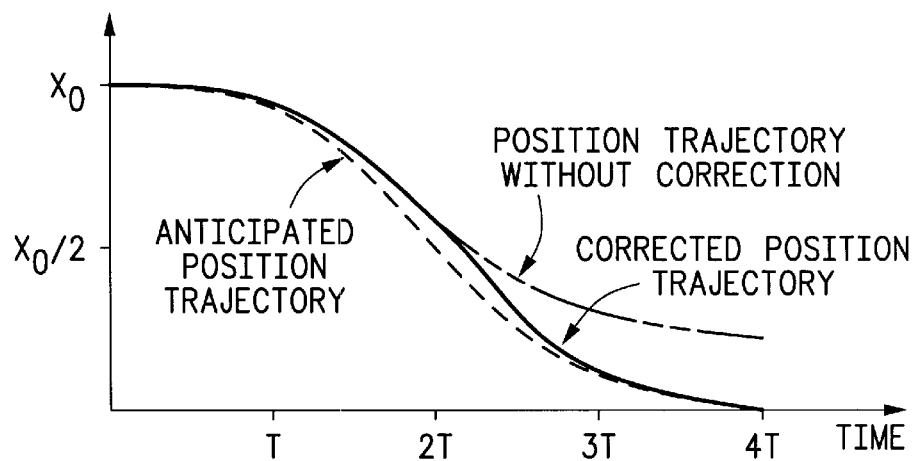

Referring now to FIGS. 6–8, an exemplary double integrator plant to correct for parameter variations is illustrated to further facilitate an understanding of the present invention. The matrices of the double integrator plant represented by equation 1 can be expressed as follows:

$$A = \begin{bmatrix} 0 & 0 \\ 0 & 1 \end{bmatrix} \quad B = \begin{bmatrix} 0 \\ K \end{bmatrix} \quad \text{and} \quad \underline{x}(t) = \begin{bmatrix} position\,(t) \\ velocity\,(t) \end{bmatrix}$$

where K represents the plant gain term which is constant, but unknown over the time period of the state transition operation. It is assumed that due to the length of the state transition requested, that two sampling/update periods are required to change the plant to approximately half-way to the final position, with a near maximum control/command update signals.

The control/command update signals that are provided by the drive unit are illustrated in FIG. 6. The control/command update signals can be proportional to the acceleration of the plant. FIG. 7 illustrates the velocity of the plant, which may be the integration of acceleration times the gain (K) of the plant. FIG. 8 is the position of the plant.

Initially, the system receives a request for a state transition. The system next determines the length of the state transition. In this embodiment length of the state transition will require n=2 and m=2 so that the state transition will be completed at 4T. From this information, the system either looks-up or calculates an initial current Ir to change the plant to the intermediate state at 2T. This initial current flow is based on an anticipated value for the forward gain (K) of the system and time interval 2T. It is assumed that for this example the anticipated value is higher than the actual (i.e., unknown) K. As a result of a lower than anticipated K, the velocity and position of the system at the intermediate state are both lower than anticipated (See FIGS. 7 and 8).

Position data is collected at times T and 2T. From the collected position data, the system at time 2T generates an estimate to K which preferably reveals that K is lower than initially anticipated. Based on this result, the plant calculates two new output current values, Ix and Iy, which will bring the plant velocity to zero at 4T and ensure that the position error is zero at time 4T.

The acceleration of the plant is readily forced to zero at time 4T by simply turning off the current flow at time 4T. Since the plant may be less than half the distance at time 2T, the system can decelerate at a slower rate over the time period 2T to 3T to allow the position error to be reduced, and can decelerate at a higher than initial value over the 3T to 4T time period in order to obtain approximately zero velocity error at time 4T.

The method and devices of the present invention can change the state of the plant accurately and quickly to another state (i.e. position, velocity, acceleration, temperature, and pH) with minimal overshoot or undershoot. The methods and devices can enable changes in the state of the plant to be performed in the shortest time possible allowed by the dynamics of the plant. The methods and devices may be utilized, for example, to control floppy disk devices, CD devices, video disk devices, hard disk drive devices, automatic focusing devices (i.e., camera lens).

The plant can be controlled to meet specific states at specific quantized time intervals. The plant can be changed from an initial state to a final state (i.e. position, velocity, and acceleration) in an optimal number of time intervals (i.e., servo bursts).

A set of control/command update signals are generated to cause the plant to reach a predetermined state. From the predetermined state, control/command update signals are generated to ensure that the plant will arrive at the desired state in a minimum amount of discrete time intervals. The plant arrives at the final state with approximately zero error at a discrete point in time despite uncertainty in the gain and other parameters of the plant. The plant may comprise, for example, an electromagnetic servo device (i.e. rotary actuators or coil type actuators), an electro-hydraulic system, a temperature regulating system, and a pressure control system.

Although the present invention has been described in detail by way of illustration and example, it should be understood that a wide range of changes and modifications can be made to the preferred embodiments described above without departing in any way from the scope and spirit of the invention. Thus, the described embodiments are to be considered in all respects only as illustrative and not restrictive, and the scope of the invention is, therefore. indicated by the appended claims rather than the foregoing description. All changes that come within the meaning and range of equivalency of the claims are to be embraced within their scope.

What is claimed is:

1. A method of changing the state of a plant comprising:
   determining an intermediate state;
   determining a first set of command signals to transition the plant to an intermediate state;
   applying the first set of command signals to the plant to transition the plant to the intermediate state at a first discrete time;
   sampling the state of the plant at discrete times;
   determining a present state of the plant;
   determining a second set of command signals to transition the plant from the intermediate state to a final state; and
   applying the second set of command signals to the plant to change the plant to the final state at a second discrete time; and
   wherein the first and second discrete times are separated by at least one substantially constant interval.

2. The method of claim 1 wherein the first and second discrete times correspond with one of a plurality of sample times and a plurality of control update times.

3. The method of claim 1 wherein the second set of command signals have substantially maximum values allowed by the plant.

4. The method of claim 1 further comprising the step of collecting state data.

5. The method of claim 1 wherein the final state comprises a set of states.

6. The method of claim 1 wherein the intermediate state comprises a set of states.

7. The method of claim 1 further comprising the step of maintaining the plant at the final state for a predetermined time.

8. The method of claim 1 wherein the intermediate state is no more than N discrete times from the final state where N is the order of the plant.

9. The method of claim 1 wherein the second discrete time is a minimum number of discrete times from the first discrete time allowed by the plant.

10. The method of claim 1 wherein the intermediate state is a minimum number of discrete times from an initial state.

11. A device for controlling the state of a plant comprising:

drive circuitry, coupled to the plant, generating a first set of command signals to transition the state of the plant from an initial state to all intermediate state at a first discrete time, the drive circuitry generating a second set of command signals to transition the state of the plant from the intermediate state to the final state at a second discrete time, wherein the first and second discrete times are separated by at least one discrete time interval; and a state estimator coupled to the plant to detect the state of the plant; and wherein the plant is transitioned from the intermediate state to the final state in a minimum number of discrete times allowed by the plant.

12. A device for controlling the state of a plant comprising:

drive circuitry, coupled to the plant, generating a first set of command signals to transition the state of the plant from an initial state to an intermediate state at a first discrete time, the drive circuitry generating a second set of command signals to transition the state of the plant from the intermediate state to the final state at a second discrete time, wherein the first and second discrete times are separated by at least one discrete time interval; and a state estimator coupled to the plant to detect the state of the plant; and wherein the intermediate state is no more than N discrete times from the final state where N is the order of the plant.

13. A method of changing the state of a plant comprising the steps of:

transitioning the plant from a first state to a selected state at one of a plurality of discrete times, each of the discrete times being separated by at least one discrete time interval; and transitioning the plant from the selected state to a final state at another of the plurality of discrete times.

14. The method of claim 13 further comprising the step of accelerating the plant for a first time period, and decelerating the plant for a second time period to reach the final state, wherein the first and second time periods are approximately equal.

15. The method of claim 13 wherein the plant is moved from the selected state to the final state with substantially maximum control commands allowed by the plant.

16. The method of claim 13 wherein the selected state is at a discrete time.

17. The method of claim 13 wherein the plurality of discrete times correspond to one of a sample time and a control update time.

* * * * *

UNITED STATES PATENT AND TRADEMARK OFFICE
CERTIFICATE OF CORRECTION

PATENT NO. : 6,163,730
DATED : December 19, 2000
INVENTOR(S) : David A. Hayner

It is certified that error appears in the above-identified patent and that said Letters Patent is hereby corrected as shown below:

Column 13, claim 11,
Line 22, delete "all" and replace with -- an --

Signed and Sealed this

Fifteenth Day of January, 2002

Attest:

JAMES E. ROGAN
Attesting Officer
Director of the United States Patent and Trademark Office